(12) United States Patent
Cho

(10) Patent No.: US 11,518,332 B2
(45) Date of Patent: Dec. 6, 2022

(54) AIRBAG OPERATING APPARATUS FOR VEHICLE AND CONTROL METHOD THEREOF

(71) Applicant: HYUNDAI MOBIS CO., LTD., Seoul (KR)

(72) Inventor: Chung Hoon Cho, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 335 days.

(21) Appl. No.: 16/855,271

(22) Filed: Apr. 22, 2020

(65) Prior Publication Data

US 2020/0339054 A1    Oct. 29, 2020

(30) Foreign Application Priority Data

Apr. 23, 2019  (KR) .................. 10-2019-0047318

(51) Int. Cl.
*B60R 21/017*     (2006.01)
*B60R 21/23*      (2006.01)
(Continued)

(52) U.S. Cl.
CPC .......... *B60R 21/017* (2013.01); *B60R 21/013* (2013.01); *B60R 21/23* (2013.01); *B60R 2021/23107* (2013.01)

(58) Field of Classification Search
CPC ..... B60R 21/017; B60R 21/013; B60R 21/23; B60R 21/23107
See application file for complete search history.

(56) References Cited

U.S. PATENT DOCUMENTS

| 5,204,547 | A | * | 4/1993 | Schumacher | ......... | B60R 21/017 |
| | | | | | | 180/274 |
| 6,072,246 | A | * | 6/2000 | Schafer | .................. | B60R 21/017 |
| | | | | | | 180/282 |

(Continued)

FOREIGN PATENT DOCUMENTS

| EP | 1612111 A2 | * | 1/2006 | ............ | B60R 21/017 |
| ES | 2633115 T3 | * | 9/2017 | ......... | B60R 21/0132 |

(Continued)

*Primary Examiner* — Paul N Dickson
*Assistant Examiner* — Kurtis Nielson
(74) *Attorney, Agent, or Firm* — NovoTechIP International PLLC

(57) ABSTRACT

An airbag operating apparatus for a vehicle may include: a sensing signal input unit configured to receive a sensing signal; a plurality of squib driving units including input ports connected in parallel to one another, having internal resistances set different from one another, installed to correspond to a plurality of airbags, respectively, and configured to drive the corresponding airbags when reaching an ignition current value according to airbag deployment signals; a storage unit configured to store the internal resistances of the plurality of squib driving units and output voltages of the airbag deployment signals according to deployment situations; and a control unit configured to receive the sensing signal from the sensing signal input unit, determine situations for deploying the plurality of airbags, and output the airbag deployment signals as output voltages to the input ports of the plurality of squib driving units according to the determination result.

11 Claims, 3 Drawing Sheets

(51) Int. Cl.
*B60R 21/013* (2006.01)
*B60R 21/231* (2011.01)

(56) References Cited

U.S. PATENT DOCUMENTS

| | | | | |
|---|---|---|---|---|
| 6,209,910 B1 * | 4/2001 | Nagae | ................... | B60R 21/017 180/282 |
| 6,216,070 B1 * | 4/2001 | Hayashi | ............. | B60R 21/0132 180/282 |
| 6,275,756 B1 * | 8/2001 | Griggs | ................. | B60R 21/017 342/72 |
| 6,278,924 B1 * | 8/2001 | Gioutsos | ............... | B60R 21/013 280/735 |
| 6,293,583 B1 * | 9/2001 | Fujishima | ............. | B60R 21/017 280/728.1 |
| 6,363,307 B1 * | 3/2002 | Ikegami | ............... | B60R 21/017 701/45 |
| 6,698,791 B1 * | 3/2004 | Furui | ................... | B60R 21/017 280/741 |
| 6,709,012 B1 * | 3/2004 | Tanaka | ................. | B60R 21/017 280/736 |
| 9,145,104 B2 * | 9/2015 | Ito | ......................... | B60R 21/015 |
| 2019/0299891 A1 * | 10/2019 | Pusheck | ................ | B60R 21/013 |

FOREIGN PATENT DOCUMENTS

| | | | |
|---|---|---|---|
| JP | H11500525 A | * | 1/1999 |
| JP | 2004284388 | * | 10/2004 |
| WO | WO-8904779 A1 | * | 6/1989 |
| WO | WO-9105680 A1 | * | 5/1991 |

\* cited by examiner

AIRBAG OPERATING APPARATUS FOR VEHICLE AND CONTROL METHOD THEREOF

CROSS-REFERENCE TO RELATED APPLICATION

This application claims priority from and the benefit of Korean Patent Application No. 10-2019-0047318, filed on Apr. 23, 2019, which is hereby incorporated by reference for all purposes as if set forth herein.

BACKGROUND

Field

Exemplary embodiments of the present disclosure relate to an airbag operating apparatus for a vehicle and a control method thereof, and more particularly, to an airbag operating apparatus for a vehicle, which can differently set internal resistances of a plurality of squib driving units for driving a plurality of airbags, sequentially outputs different voltage values as the output voltages of airbag deployment signals, and thus operates the plurality of squib driving units through one output port to independently drive the plurality of airbags, and a control method thereof.

Discussion of the Background

In general, a vehicle includes a driver airbag (DAB) installed in a steering wheel and a passenger airbag (PAB) installed in a crash pad in front of the passenger seat, in order to reduce an injury of a driver or a passenger on a passenger seat in case of an accident. Furthermore, a high-class vehicle additionally includes a side airbag which is installed outside a seat back and a curtain airbag which is installed in a roof side rail and covers a door glass when deployed.

Such an airbag apparatus first determines a collision of the vehicle using sensing information measured through various sensors mounted in the vehicle, in order to decide whether to deploy the airbags of the vehicle in case of a collision accident of the vehicle.

That is, the airbag apparatus determines a collision and the intensity of the collision, using deceleration/acceleration information measured through an acceleration sensor included in an airbag control unit located in the vehicle, a front collision sensor mounted at the front of the vehicle, and a side collision sensor mounted on a side of the vehicle.

Therefore, the airbag apparatus applies the deceleration/acceleration information measured through such various sensors to an airbag deployment algorithm, in order to decide when to deploy the airbags.

Recently, with the increasing demand for safety requirements, the number of airbags installed in a vehicle has increased. Thus, the number of squib driving units for driving the airbags has also increased.

When the number of squib driving units is increased, the number of output ports through which the airbag control unit outputs airbag deployment signals to the respective squib driving units is increased. Then, the size of a connector as well as the number of pins in the connector is increased, and the number of wire harnesses is also increased, thereby raising the weight and material cost.

SUMMARY

Various embodiments are directed to an airbag operating apparatus for a vehicle, which can differently set internal resistances of a plurality of squib driving units for driving a plurality of airbags, sequentially outputs different voltage values as the output voltages of airbag deployment signals, and thus operates the plurality of squib driving units through one output port to independently drive the plurality of airbags, and a control method thereof.

In an embodiment, an airbag operating apparatus for a vehicle may include: a sensing signal input unit configured to receive a sensing signal from a collision sensor which senses a collision; a plurality of squib driving units including input ports connected in parallel to one another, having internal resistances set different from one another, installed to correspond to a plurality of airbags, respectively, and configured to drive the corresponding airbags when reaching an ignition current value according to airbag deployment signals inputted through the input ports; a storage unit configured to store the internal resistances of the plurality of squib driving units and output voltages of the airbag deployment signals according to deployment situations; and a control unit configured to receive the sensing signal from the sensing signal input unit, determine situations for deploying the plurality of airbags, and output the airbag deployment signals as output voltages to the input ports of the plurality of squib driving units according to the determination result, the output voltage being set according to the internal resistances of the plurality of squib driving units, stored in the storage unit.

The control unit may determine the situations for deploying the plurality of airbags, and sequentially output the airbag deployment signals as the output voltages according to the deployment order of the plurality of airbags and deployment time differences among the plurality of airbags, the output voltages being set according to the internal resistances of the plurality of squib driving units.

Among the internal resistances of the plurality of squib driving units, the internal resistance of the squib driving unit of the airbag which is first deployed before the other airbags may be smaller than parallel resistances among the other squib driving units.

The internal resistances of the plurality of squib driving units may be disconnected when the respective squib driving units are operated.

In an embodiment, a control method of an airbag driving apparatus for a vehicle may include: receiving, by a control unit, a sensing signal from a sensing signal input unit, the sensing signal being generated when a collision is sensed; determining, by the control unit, deployment situations of a plurality of airbags based on the input sensing signal; checking, by the control unit, output voltages through a storage unit, based on the determination result for the deployment situations of the plurality of airbags, the output voltages being set according to internal resistances of a plurality of squib driving units; and outputting, by the control unit, airbag deployment signals according to the set output voltages to input ports of the plurality of squib driving units.

In the outputting of the airbag deployment signals, the control unit may sequentially output the airbag deployment signals as the output voltages according to the deployment order of the plurality of airbags and deployment time differences among the plurality of airbags, the output voltages being set according to the internal resistances of the plurality of squib driving units.

Among the internal resistances of the plurality of squib driving units, the internal resistance of the squib driving unit of the airbag which is first deployed before the other airbags may be smaller than parallel resistances among the other squib driving units.

The internal resistances of the plurality of squib driving units may be disconnected when the respective squib driving units are operated.

The airbag operating apparatus and the control method of the airbag operating apparatus for a vehicle in accordance with the embodiment of the present disclosure may differently set the internal resistances of the respective squib driving units for driving the plurality of airbags, sequentially output different voltage values as the output voltages of the airbag deployment signals, and thus independently operate the plurality of squib driving units through one output port to drive the plurality of airbags.

DETAILED DESCRIPTION OF THE ILLUSTRATED EMBODIMENTS

Hereinafter, an airbag operating apparatus for a vehicle and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
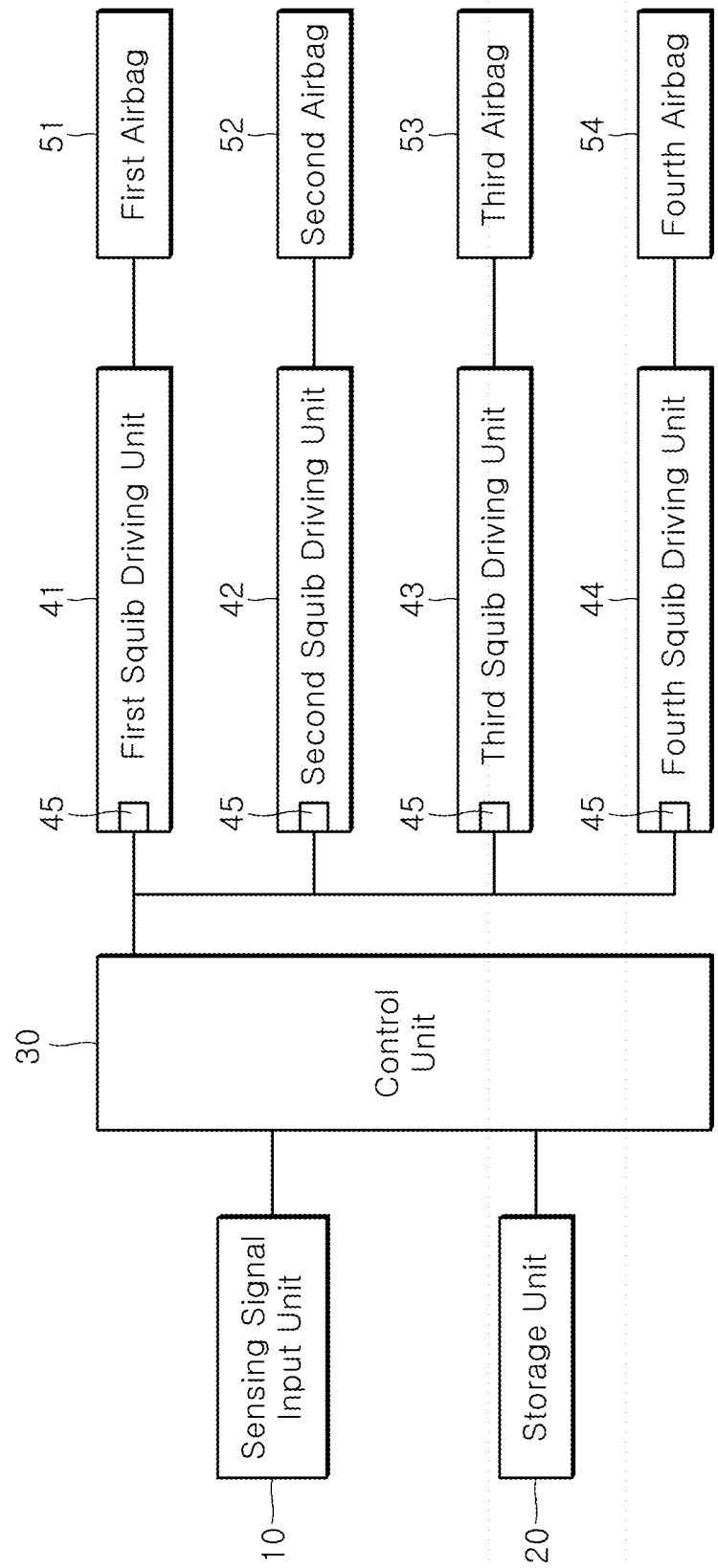
FIG. 1 is a block diagram illustrating an airbag operating apparatus for a vehicle in accordance with an embodiment of the present disclosure.
Figure 2:
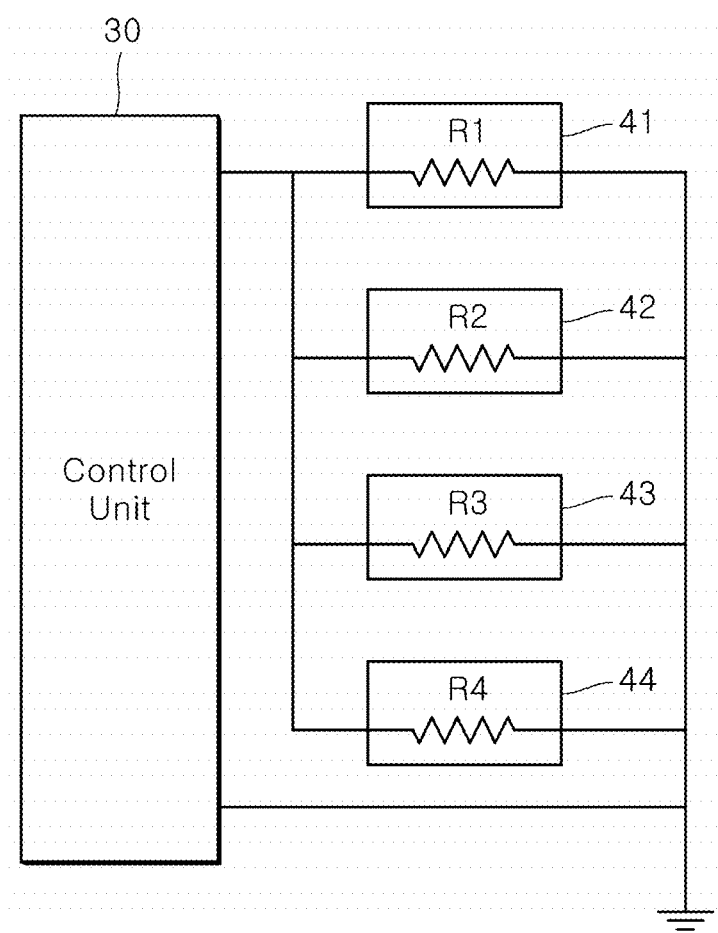
FIG. 2 is an equivalent circuit diagram illustrating a squib driving unit in the airbag operating apparatus for a vehicle in accordance with the embodiment of the present disclosure.

FIG. 1 is a block diagram illustrating an airbag operating apparatus for a vehicle in accordance with an embodiment of the present disclosure, and FIG. 2 is an equivalent circuit diagram illustrating a squib driving unit in the airbag operating apparatus for a vehicle in accordance with the embodiment of the present disclosure.

As illustrated in FIG. 1, the airbag operating apparatus for a vehicle in accordance with the embodiment of the present disclosure may include a sensing signal input unit 10, first to fourth squib driving units 41 to 44, a storage unit 20 and a control unit 30.

The sensing signal input unit 10 may receive a sensing signal from a collision sensor (not illustrated) for sensing a collision of a vehicle, and provide the sensing signal to the control unit 30.

The collision sensor may include an acceleration sensor and a gyro sensor, and include other sensors to sense a collision of the vehicle.

The sensing signal input unit 10 may be configured in the form of terminals capable of receiving signals.

The first to fourth squib driving units 41 to 44 include input ports 45 connected in parallel to one another, have internal resistances R1 to R4 set differently from one another, and are installed to correspond to first to fourth airbags 51 to 54, respectively. When reaching an ignition current value according to an airbag deployment signal inputted through the input port 45, each of the first to fourth squib driving units 41 to 44 may operate the corresponding airbag.

Each of the first to fourth airbags 51 to 54, which are safety devices for minimizing an impact of a driver in case of a collision accident of the vehicle, may include a seat belt pretensioner which reversely pulls a belt using explosive power of gunpowder.

As illustrated in FIG. 2, the first to fourth squib driving units 41 to 44 may be represented by the respective internal resistances R1 to R4 through equivalent circuits.

Desirably, among the internal resistances of the first to fourth squib driving units 41 to 44, the internal resistance of the squib driving unit of the airbag which is first deployed before the other airbags, among the first to fourth airbags 51 to 54, may be set to a smaller value than parallel resistances between the respective other squib driving units.

For example, when the squib driving units are operated in order of the first squib driving unit 41, the third squib driving unit 43, the second squib driving unit 42 and the fourth squib driving unit 44, the internal resistances and the parallel resistances may be set as shown in Table 1.

TABLE 1

| | Resistance value (ohm) |
|---|---|
| R1 | 1 |
| R2 | 3 |
| R3 | 5 |
| R4 | 7 |
| R24 | 2.1 |
| R34 | 2.91666667 |
| R234 | 1.478873239 |
| Rtotal | 0.596590909 |

In Table 1, R1 to R4 represent the respective internal resistances of the first to fourth squib driving units 41 to 44, R24 represents a parallel resistance between the second and fourth squib driving units 42 and 44, R34 represents a parallel resistance between the third and fourth squib driving units 43 and 44, R234 represents a parallel resistance among the second to fourth squib driving units 42 to 44, and Rtotal represents a parallel resistance among the first to fourth squib driving units 41 to 44.

Therefore, a condition of (R234>R1) is satisfied in order for the first squib driving unit 41 to operate for the first time, a condition of (R4>R3) as well as a condition of (R2>R34) is satisfied in order for the third squib driving unit 43 to operate after the first squib driving unit 41 is operated, and a condition of (R4>R2) is satisfied in order for the second squib driving unit 42 to operate.

At this time, when each of the squib driving units is operated, a disconnection occurs. Thus, no current path is formed while the internal resistance is infinite.

The storage unit 20 may store the internal resistances of the first to fourth squib driving units 41 to 44 and output voltages of the airbag deployment signals according to deployment situations.

The control unit 30 may receive the sensing signal from the sensing signal input unit 10, and determine situations for deploying the first to fourth airbags 51 to 54. Then, according to the determination result, the control unit 30 may sequentially output the airbag deployment signals as output voltages to the respective input ports 45 of the first to fourth squib driving units 41 to 44 through one output port 35, and thus independently drive the first to fourth airbags 51 to 54, the output voltages being set based on the internal resistances R1 to R4 of the first to fourth squib driving units 41 to 44, which are stored in the storage unit 20, according to the deployment order of the first to fourth airbags 51 to 54 and deployment time differences among the first to fourth airbags 51 to 54.

For example, when the internal resistances R1 to R4 of the first to fourth squib driving units 41 to 44 are set as shown in Table 1, an ignition current value for driving the first to fourth airbags 51 to 54 is assumed to be 1.75 A, and the airbags are operated in order of the first airbag 51, the third airbag 53, the second airbag 52 and the fourth airbag 54, the output voltages of the airbag deployment signals may be set to four ranges V1 to V4 as shown in Table 2, and outputted.

TABLE 2

| Voltage | Output voltage [V] of airbag deployment signal | |
|---|---|---|
| | Minimum Value | Maximum Value |
| V1 | 1.75 | 5.25 |
| V2 | 8.75 | 12.25 |
| V3 | 5.25 | 8.75 |
| V4 | 12.25 | — |

Therefore, when the voltage V1 is outputted as the output voltage of the airbag deployment signal to operate the first squib driving unit 41, the condition of (R234>R1) is satisfied to operate the first squib driving unit 41.

Furthermore, when the voltage V2 is outputted as the output voltage of the airbag deployment signal after the first squib driving unit 41 is operated, the condition of (R2>R34) and the condition of (R4>R3) are satisfied to operate the third squib driving unit 43. At this time, the first squib driving unit 41 is operated to disconnect the resistance R1.

When the voltage V3 is outputted as the output voltage of the airbag deployment signal after the first and third squib driving units 41 and 43 are operated, the condition of (R4>R2) is satisfied to operate the second squib driving unit 42, while the resistances R1 and R3 are disconnected.

Then, when the voltage V4 is outputted as the airbag deployment signal, the fourth squib driving unit 44 is operated while the resistances R1 to R3 are disconnected, because the first to third squib driving units 41 to 43 have been operated.

Meanwhile, in this embodiment, receiving detection signals from various sensors and determining whether to drive each of the plurality of airbags based on the detection signals may adopt various methods that have been used or widely used in the technical field of the present invention, and thus detailed description thereof will be omitted.

As described above, the airbag operating apparatus for a vehicle in accordance with the embodiment of the present disclosure may differently set the internal resistances of the respective squib driving units for driving the plurality of airbags, sequentially output different voltage values as the output voltages of the airbag deployment signals, and thus independently operate the plurality of squib driving units through one output port to drive the plurality of airbags.

Figure 3:
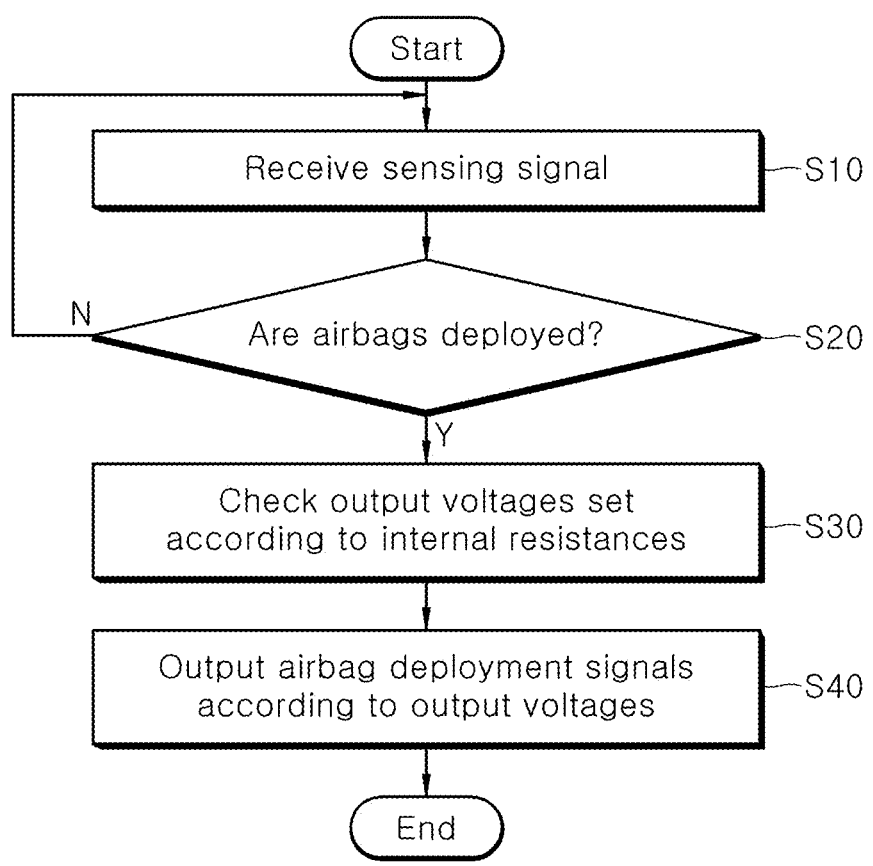
FIG. 3 is a flowchart for describing a control method of an airbag operating apparatus for a vehicle in accordance with an embodiment of the present invention.

FIG. 3 is a flowchart for describing a control method of an airbag operating apparatus for a vehicle in accordance with an embodiment of the present invention.

As illustrated in FIG. 3, the control method of the airbag operating apparatus for a vehicle in accordance with the embodiment of the present disclosure starts with step S10 in which the control unit 30 receives a sensing signal from a collision sensor (not illustrated), which senses a collision, from the sensing signal input unit 10.

After receiving the sensing signal from the collision sensor for sensing a collision in step S10, the control unit 30 determines deployment situations of the first to fourth airbags 51 to 54 based on the received sensing signal, in step S20.

When the determination result of step S20 indicates that the airbags are not deployed, the control unit 30 returns to step S10 to repeat the process of receiving the sensing signal.

However, when the determination result of step S20 indicates that the airbags are deployed, the control unit 30 checks the output voltages of the airbag deployment signals, which are set according to the internal resistances of the first to fourth squib driving units 41 to 44, through the storage unit 20, in step S30.

For example, as illustrated in FIG. 2, the first to fourth squib driving units 41 to 44 may be represented by the internal resistances R1 to R4 through equivalent circuits.

Desirably, among the internal resistances of the first to fourth squib driving units 41 to 44, the internal resistance of the squib driving unit of the airbag which is first deployed before the other airbags, among the first to fourth airbags 51 to 54, may be set to a smaller value than parallel resistances between the respective other squib driving units.

For example, when the squib driving units are operated in order of the first squib driving unit 41, the third squib driving unit 43, the second squib driving unit 42 and the fourth squib driving unit 44, the internal resistances and the parallel resistances may be set as shown in Table 3.

TABLE 3

| | Resistance value (ohm) |
|---|---|
| R1 | 1 |
| R2 | 3 |
| R3 | 5 |
| R4 | 7 |
| R24 | 2.1 |
| R34 | 2.91666667 |
| R234 | 1.478873239 |
| Rtotal | 0.596590909 |

In Table 1, R1 to R4 represent the respective internal resistances of the first to fourth squib driving units 41 to 44, R24 represents a parallel resistance between the second and fourth squib driving units 42 and 44, R34 represents a parallel resistance between the third and fourth squib driving units 43 and 44, R234 represents a parallel resistance among the second to fourth squib driving units 42 to 44, and Rtotal represents a parallel resistance among the first to fourth squib driving units 41 to 44.

Therefore, a condition of (R234>R1) is satisfied in order for the first squib driving unit 41 to operate for the first time, a condition of (R4>R3) as well as a condition of (R2>R34) is satisfied in order for the third squib driving unit 43 to operate after the first squib driving unit 41 is operated, and a condition of (R4>R2) is satisfied in order for the second squib driving unit 42 to operate.

At this time, when each of the squib driving units is operated, a disconnection occurs. Thus, no current path is formed while the internal resistance is infinite.

Therefore, the control unit 30 may check the internal resistances of the first to fourth squib driving units 41 to 44 and the output voltages of the airbag deployment signals according to the deployment situations, which are stored in the storage unit 20.

After checking the output voltages of the airbag deployment signal in step S30, the control unit 30 outputs the set output voltages to the respective input ports 45 of the first to fourth squib driving units 41 to 44 in step S40.

The control unit 30 may sequentially output the output voltages to the respective input ports 45 of the first to fourth squib driving units 41 to 44, and thus independently drive the first to fourth airbags 51 to 54, the output voltages being set based on the internal resistances R1 to R4 of the first to fourth squib driving units 41 to 44, which are stored in the storage unit 20, according to the deployment order of the first to fourth airbags 51 to 54 and deployment time differences among the first to fourth airbags 51 to 54.

As described above, the control method of the airbag operating apparatus for a vehicle in accordance with the embodiment of the present disclosure may differently set the internal resistances of the respective squib driving units for driving the plurality of airbags, sequentially output different voltage values as the output voltages of the airbag deployment signals, and thus independently operate the plurality of squib driving units through one output port to drive the plurality of airbags.

The embodiments described in this specification may be implemented with a method or process, a device, a software program, a data stream or a signal, for example. Although the embodiments have been discussed in a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag operating apparatus for a vehicle, comprising:
    a sensing signal input unit configured to receive a sensing signal indicating an occurrence of a collision;
    a plurality of squib driving units configured to drive a plurality of airbags, respectively, each squib driving including an input port, having an internal resistance different from each other and configured to drive the respective airbag when a voltage overcoming the internal resistance is received by the input port, wherein the input ports of the squib driving units are connected in parallel;
    a storage unit configured to store the internal resistances of the plurality of squib driving units and a plurality of output voltages for a plurality of airbag deployment signals corresponding to a situation for deploying the plurality of airbags; and
    a control unit configured to:
        receive the sensing signal from the sensing signal input unit;
        determine, based on the received sensing signal, the situation for deploying the plurality of airbags; and
        sequentially output, based on the determined situation, the airbag deployment signals to the input ports of the plurality of squib driving units, each airbag deployment signal having a different output voltage set according to the plurality of internal resistances of the plurality of squib driving units stored in the storage unit,
    wherein the plurality of squib driving units are configured to simultaneously receive each airbag deployment signal and deploy the respective airbags when the output voltage of the received airbag deployment signal overcomes the respective internal resistances.

2. The airbag operating apparatus of claim 1, wherein the control unit is further configured to:
    determine the situation for deploying the plurality of airbags, and sequentially output the airbag deployment signals as the output voltages according to a deployment order of the plurality of airbags.

3. The airbag operating apparatus of claim 1, wherein the control unit is further configured to sequentially output the airbag deployment signals further based on deployment time differences among the plurality of airbags.

4. The airbag operating apparatus of claim 1, wherein:
    the plurality of squib driving units includes a first squib driving unit set to be deployed earlier than other squib driving units, and
    the internal resistance of the first squib driving unit is smaller than parallel resistances among the other squib driving units.

5. The airbag operating apparatus of claim 1, wherein the internal resistances of the plurality of squib driving units are disconnected when the respective squib driving units are operated.

6. A method of operating an airbag driving apparatus for a vehicle, the airbag driving apparatus including a plurality of squib driving units configured to drive a plurality of airbags, respectively, each squib driving unit having an internal resistance different from each other and configured to drive the respective airbag when a voltage overcoming the respective internal resistance is received, the method comprising:

receiving a sensing signal indicating an occurrent of a collision;;

determining, based on the sensing signal, a situation for deploying the plurality of airbags;

determining, based on the internal resistances of the plurality of squib driving units, a plurality of output voltages for the determined situation for deploying the plurality of airbags, the plurality of output voltages being different from each other; and sequentially outputting, to the plurality of squib driving units, a plurality of airbag deployment signals, each airbag deployment signal having a different one of the plurality of output voltages, wherein the output voltage of each airbag deployment signal is simultaneously applied to the plurality of squib driving units, and each squib driving unit is configured to drive the respective airbag when the applied output voltage overcomes the respective internal resistance.

7. The method of claim 6, wherein sequentially outputting the plurality of airbag deployment signals comprises sequentially outputting the airbag deployment signals according to a deployment order of the plurality of airbags.

8. The method of claim 7, wherein sequentially outputting the plurality of airbag deployment signals comprises sequentially outputting the airbag deployment signals further based on deployment time differences among the plurality of airbags.

9. The method of claim 6, wherein:
the plurality of squib driving units includes a first squib driving unit set to be deployed earlier than other squib driving units, and
the internal resistance of the first squib driving unit is smaller than parallel resistances among the other squib driving units.

10. The method of claim 6, wherein the internal resistances of the plurality of squib driving units are disconnected when the respective squib driving units are operated.

11. A method of operating an airbag driving apparatus for a vehicle, the airbag driving apparatus including a plurality of squib driving units configured to drive a plurality of airbags, respectively, each squib driving unit having an internal resistance different from each other and configured to drive the respective airbag when a voltage overcoming the respective internal resistance is received, the method comprising:

receiving a collision signal indicating an occurrence of a collision;

determining, based on the received collision signal, a situation for deploying the plurality of airbags;

determining, based on the internal resistances of the squib driving units and the determined situation for deploying the airbags, a plurality of output voltages for the plurality of squib driving units; and outputting, to the plurality of squib driving units, a plurality of airbag deployment signals, each airbag deployment signal having a different one of the plurality of output voltages, wherein, among the plurality of squib driving units, one that has the internal resistance smaller than parallel resistances among the other squib driving units is deployed before the other airbags.

* * * * *